US012669402B2

(12) United States Patent
Ding et al.

(10) Patent No.: US 12,669,402 B2
(45) Date of Patent: Jun. 30, 2026

(54) AUDIO BASED WOODEN UTILITY POLE DECAY DETECTION BASED ON DISTRIBUTED ACOUSTIC SENSING AND MACHINE LEARNING

(71) Applicant: NEC Laboratories America, Inc., Princeton, NJ (US)

(72) Inventors: Yangmin Ding, East Brunswick, NJ (US); Yue Tian, Princeton, NJ (US); Sarper Ozharar, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 585 days.

(21) Appl. No.: 18/113,023

(22) Filed: Feb. 22, 2023

(65) Prior Publication Data

US 2023/0266196 A1      Aug. 24, 2023

Related U.S. Application Data

(60) Provisional application No. 63/313,036, filed on Feb. 23, 2022.

(51) Int. Cl.
*G01M 5/00*                (2006.01)

(52) U.S. Cl.
CPC ........ *G01M 5/0033* (2013.01); *G01M 5/0025* (2013.01); *G01M 5/0066* (2013.01)

(58) Field of Classification Search
CPC ............. G01M 5/0033; G01M 5/0025; G01M 5/0066; G01N 22/36; G01N 29/44;
(Continued)

(56) References Cited

U.S. PATENT DOCUMENTS

2018/0357542 A1    12/2018  Wu et al.
2020/0003588 A1     1/2020  Huang et al.
(Continued)

FOREIGN PATENT DOCUMENTS

EP              3846299 A1      7/2021
KR        20200053093 A  *  5/2020   ......... G06Q 10/0635
WO      WO-2020044648 A1 *  3/2020   ............. G01D 5/353

OTHER PUBLICATIONS

Machine translation of WO2020044648A1 (Year: 2020).*
Mahcine translation of KR20200053093A (Year: 2020).*

*Primary Examiner* — Lee E Rodak
*Assistant Examiner* — Sangkyung Lee
(74) *Attorney, Agent, or Firm* — Vincent Duffy

(57)                ABSTRACT

Aspects of the present disclosure describe distributed fiber optic sensing (DFOS)/distributed acoustic sensing (DAS) systems, methods, and structures that employ machine learning and provide for the automatic remote inspection and condition evaluation of wooden utility poles. Operationally, audio (acoustic) signals are obtained using DFOS/DAS when a service technician/inspector strikes the wooden utility poles with an impact tool such as a hammer. Historical audio DFOS/DAS signals that include signals resulting from hollow (decayed) utility poles and solid (good) poles are used to train one or more machine learning models and the trained machine learning models are subsequently used to evaluate real-time impact data collected from DFOS/DAS and determine utility pole condition in real-time.

1 Claim, 16 Drawing Sheets

(58) Field of Classification Search
CPC ........ G01N 22/34; G01N 29/07; G01N 29/11;
G01N 29/14; G01N 22/24; G01N 29/12
See application file for complete search history.

(56) References Cited

U.S. PATENT DOCUMENTS

2020/0313763 A1 * 10/2020  Wang ............... H04B 10/25753
2020/0319017 A1 * 10/2020  Tian ........................ G02B 6/483
2021/0027315 A1 *  1/2021  Nanavati ............ G06Q 30/0201
2021/0041397 A1 *  2/2021  Hall ...................... G06F 3/0482

* cited by examiner

DAC: Digital-to-analog converter
ADC: Analog-to-digital converter
DSP: Digital signal processing
WDM: Wavelength division multiplexer
BPF: Band-pass filter
LPF: Low-pass filter

FIG. 11

AUDIO BASED WOODEN UTILITY POLE DECAY DETECTION BASED ON DISTRIBUTED ACOUSTIC SENSING AND MACHINE LEARNING

CROSS REFERENCE

This application claims the benefit of U.S. Provisional Patent Application Ser. No. 63/313,036 filed 23 Feb. 2022 the entire contents of which being incorporated by reference as if set forth at length herein.

TECHNICAL FIELD

This disclosure relates generally to distributed fiber optic sensing (DFOS)/distributed acoustic sensing (DAS) systems, methods, and structures. More particularly, it pertains to audio based wooden utility pole decay detection using DAS and machine learning.

BACKGROUND

Recently, DFOS systems and methods have been employed to provide superior acoustic and/or vibrational monitoring of roadways, bridges, and buildings. The reliability, robustness, and sensitivity of such systems is generally known to be unmatched by existing, legacy systems and methods.

As those skilled in the art will understand and appreciate, wooden utility poles are widely used to aerially support electric power lines and telecommunications lines throughout world due to their durability, strength, and relatively low installation costs. As a result of their universal deployment and importance to utilities of contemporary society, wooden utility poles must be frequently monitored to determine their physical condition. Service disruptions resulting from failing or otherwise damaged utility poles and the subsequent repair and/or replacement of such utility poles may be quite expensive. Given the importance of wooden utility poles and the utility services they support, enhanced methods that facilitate the determination of their operational condition using DFOS would represent a welcome addition to the art.

SUMMARY

An advance in the art is made according to aspects of the present disclosure directed to DFOS/DAS systems, methods, and structures that employ machine learning and provide for the automatic remote inspection and condition evaluation of wooden utility poles.

As we shall show and describe and audio (acoustic) signals are obtained using DFOS/DAS when a service technician/inspector strikes the wooden utility poles with an impact tool such as a hammer. Historical audio DFOS/DAS signals that include signals resulting from hollow (decayed) utility poles and solid (good) poles are used to train one or more machine learning models and the trained machine learning models are subsequently used to evaluate real-time impact data collected from DFOS/DAS and determine utility pole condition in real-time.

In sharp contrast to the prior art, our inventive system and method according to the present disclosure proceeds as follows:

A DFOS/DAS interrogator located in a central office is connected to a target route in which wooden utility poles to be inspected are deployed.

A technician/inspector introduces an impact (hits) the wooden utility pole with a hammer or other impact instrument as in a regular sound-based inspection. Note that in this step, the technician/inspector does not evaluate the wooden utility pole condition. The operation is merely a "hit and go". During this operation, historical DFOS/DAS audio signal data resulting from the impact to the wooden utility poles—some exhibiting different structural condition(s)—is collected.

The historical DFOS/DAS audio signal data resulting from the impacts to the wooden utility poles exhibiting various pole structural conditions are used to train a machine learning model.

Subsequently, the trained machine learning model is employed to classify subsequent DFOS/DAS signal data for the wooden utility poles and characterize the poles into end user-defined categories.

BRIEF DESCRIPTION OF THE DRAWING

A more complete understanding of the present disclosure may be realized by reference to the accompanying drawing in which:

Figure 11:
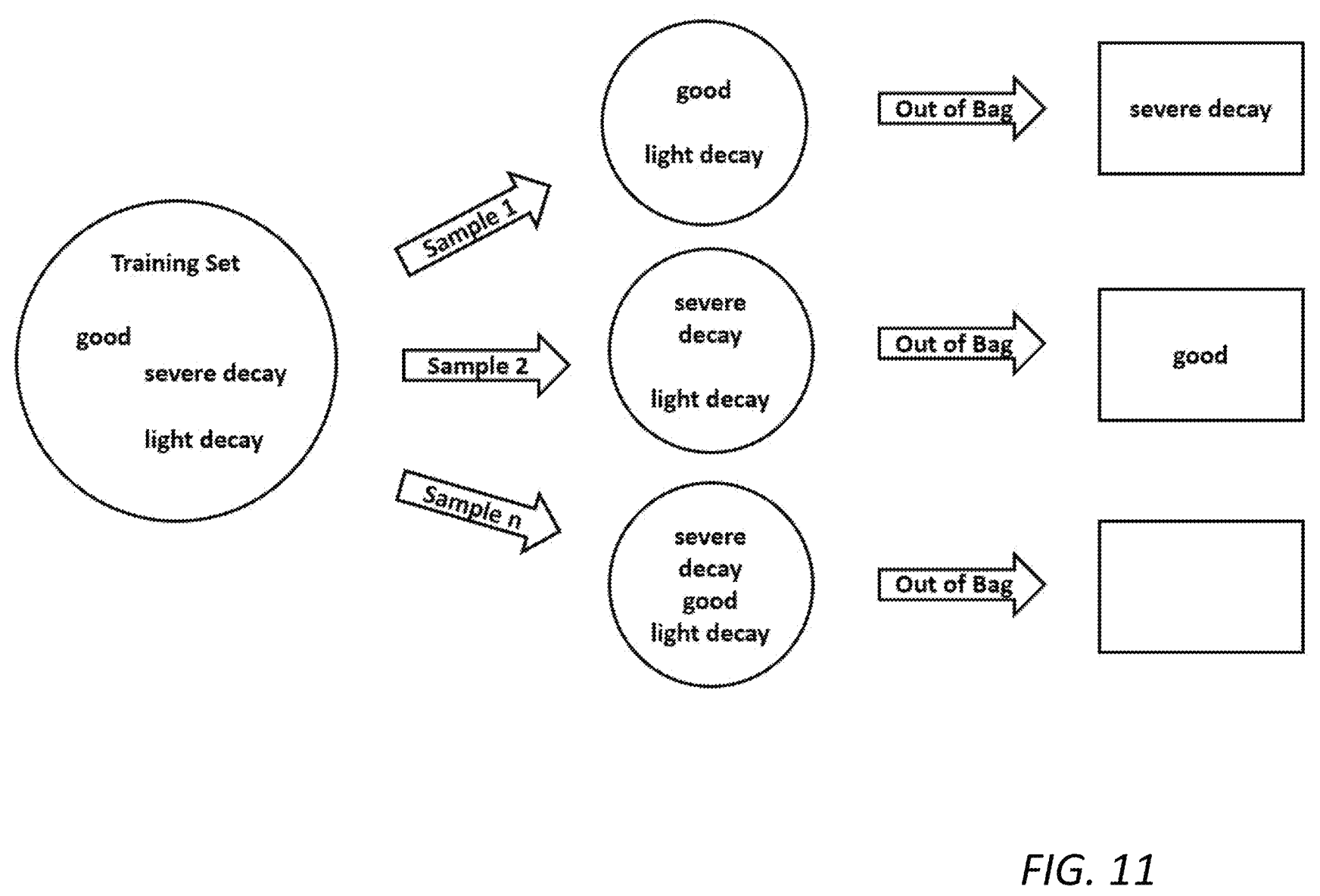

FIG. 11 is a schematic diagram illustrating out of bag samples and out-of-bag score an internal model performance unique to Random Forests according to aspects of the present disclosure.

DESCRIPTION

Figure 1:
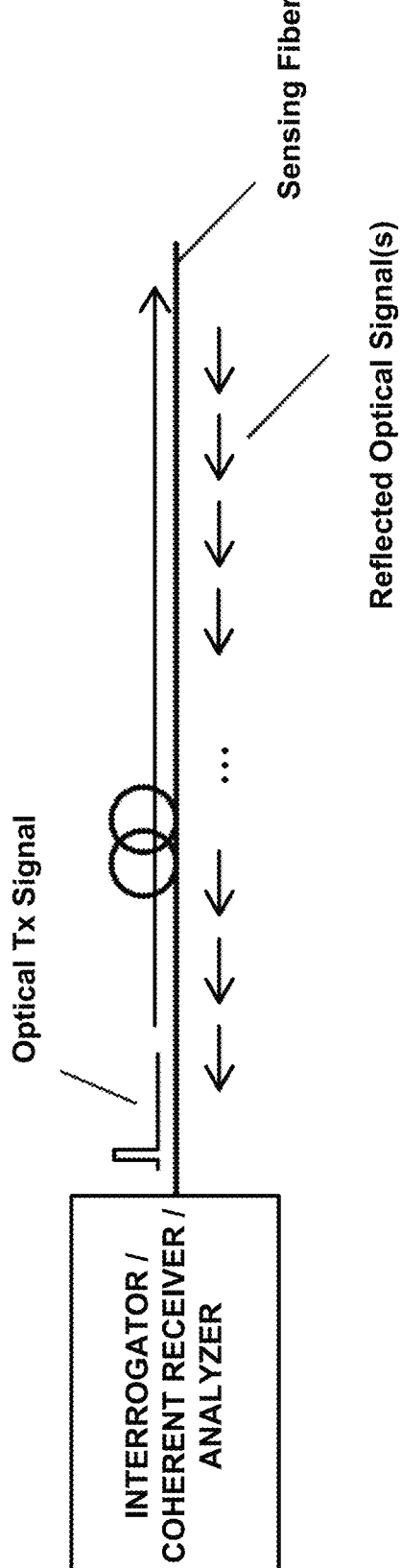
FIG. 1 is a schematic diagram illustrating a DFOS system including interrogator, coherent receiver, and analyzer according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

FIG. 1 is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

Figure 2:
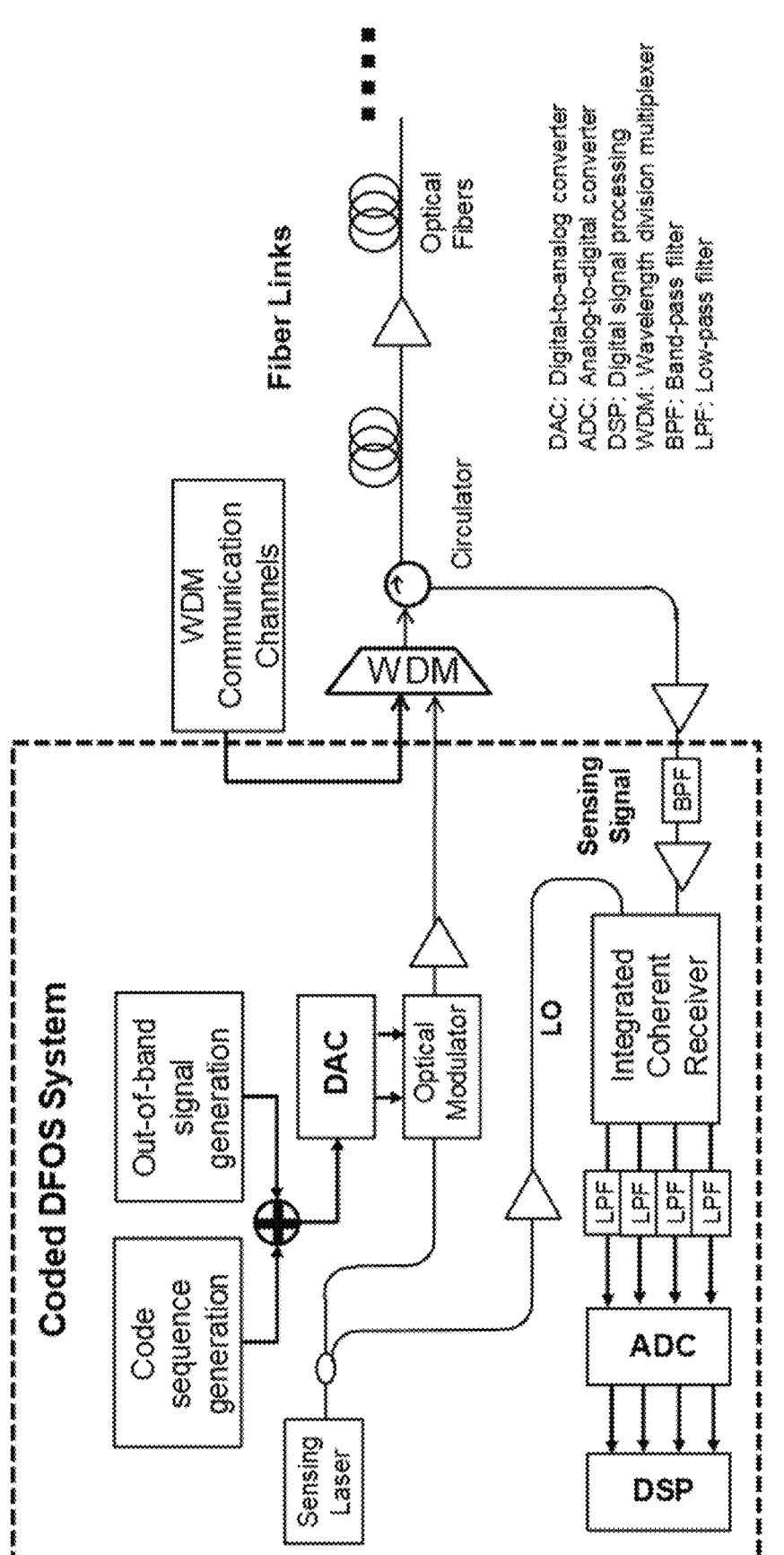
FIG. 2 is a schematic diagram illustrating a coded DFOS system with coherent receiver according to aspects of the present disclosure.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement known in the art such as that illustrated in FIG. 2 as well as an intelligent analyzer that may employ machine learning structures and models.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing or DAS) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest to integrate communications systems and sensing systems on a common fiber that may be part of a larger, multi-fiber cable.

Operationally, we assume that the DFOS system will be Rayleigh-scattering based system (e.g., distributed acoustic sensing or DAS) and Brillouin-scattering based system (e.g., Brillouin optical time domain reflectometry or BOTDR) with a coding implementation. With such coding designs, these systems will be most likely be integrated with fiber communication systems due to their lower power operation and will also be more affected by the optical amplifier response time.

In the arrangement illustratively shown in the block diagram, we assume that the coded interrogation sequence is generated digitally and modulated onto the sensing laser via digital-to-analog-conversion (DAC) and an optical modulator. The modulated interrogation sequence may be amplified to optimal operation power before being directed into the fiber for interrogation.

Advantageously, the DFOS/DAS operation according to aspects of the present disclosure may also be integrated together with communication channels in the same fiber.

As we have previously noted, wooden utility poles are widely used to support/suspend electric power lines and telecommunications lines around world. These wooden utility poles require frequent inspection to ensure their structural integrity and uninterrupted services carried by the supported/suspended facilities.

Currently, there are three predominant methods used for the inspection of wooden utility poles including visual inspection, sound-based inspection, and bore-based inspections.

Visual inspection is suitable for identifying visible or outside defects of wooden poles. For example, an inspector will examine a wooden utility pole for cracks, holes, and outer decay when performing a visual inspection. As those skilled in the art will understand and appreciate, this type of inspection is not sufficient to identify an internal decay or defects of a pole.

Sound-based on inspection is necessarily performed by a skilled wooden utility pole inspector by hitting/striking a wooden utility pole with an impact instrument such as a hammer. Sturdy wood of a wooden utility pole produces a clear and solid sound. At places along a wooden pole—where decay is present—the wood of the wooden utility pole produces a dull and hollow sound when struck by the impact instrument. As will be further appreciated, this method is quite subjective since it is relying on an inspector's experience and "ear".

Finally, bore-based inspection is an intrusive method that requires boring a wooden utility pole with a drill or other boring tool, which unfortunately may cause additional damage to a wooden utility pole. Subsequent inspection of the sawdust coming from the borehole conveys if decay is present. If the drill goes in rapidly without resistance or little resistance, it means there is a decay pocket in the pole.

According to aspects of the present disclosure, we disclose an audio-based wooden pole inspection method combining distributed acoustic sensing and machine learning, to automatically evaluate the condition of wooden poles.

Our inventive method according to aspects of the present disclosure obtains audio signals from distributed acoustic sensing when an inspector hits a pole with an impact instrument such as a hammer. Historical DFOS/DAS audio signals that include "hollow" sounds resulting from impacts on a hollowed pole (decayed pole) and solid sound (good pole) resulting from impacts on a solid pole, are used to train machine learning models. Subsequently, real-time streaming impact/hammer data collected during DFOS/DAS is fed into the machine learning model which evaluates the condition of a pole in real-time.

The main process of the proposed method can be summarized as follows:

The distributed acoustic sensing interrogator, receiver, and intelligent analyzer is preferably located in a central office and optically connected to a target optical fiber route including wooden utility poles that are to be inspected.

A technician/inspector hits the pole with a hammer or other impact instrument as in a regular sound-based inspection. However, in this step, the technician/inspector does not need to evaluate the pole condition based on her experience, rather the operation is simply a "hit and go" procedure whereby the inspector impacts a wooden utility pole and moves onto a next one. In this procedure, the audio signal data resulting from hammer impact on the poles having various mechanical conditions/characteristics is collected.

The historical audio signal data resulting from hammer impacts on the wooden utility poles having various mechanical conditions/characteristics is then used to train a machine learning model. Subsequently, real-time hammer impact data is fed into the trained machine learning model to classify the pole into end user-defined categories.

Existing wooden pole inspection methods, such as above-mentioned visual inspection, sound-based inspection, and bore-based inspection, are either subjective or intrusive in the evaluation of the pole condition. Additionally, the inspection procedure is quite time-consuming and costly.

As those skilled in the art will understand and appreciate, our inventive systems, methods, and structures provide an efficient and accurate evaluation of wooden utility pole mechanical/structural condition(s) from DFOS/DAS data and machine learning analysis. Advantageously, our inventive systems and methods method facilitate the automatic monitoring of utility pole condition cost-effectively and prevent further damage to the poles.

At this point we briefly identify an abbreviated list of particularly innovative aspects of systems, methods, and structures according to aspects of the present disclosure namely:

Collecting wooden utility pole inspection data resulting from impact/hammer signals using distributed fiber optic sensing/distributed acoustic sensing technology using an interrogator configured for such data collection;

Evaluate wooden utility pole condition(s) based on a pre-trained machine learning model hosted in a cloud module configured for such evaluation analysis;

The audio signal-based machine learning model can advantageously be applied to different fiber routes including wooden utility poles such that no repeated training is necessary when inspecting different routes; and The wooden utility pole conditions are continuously and automatically monitored—in real-time.

Figure 3:
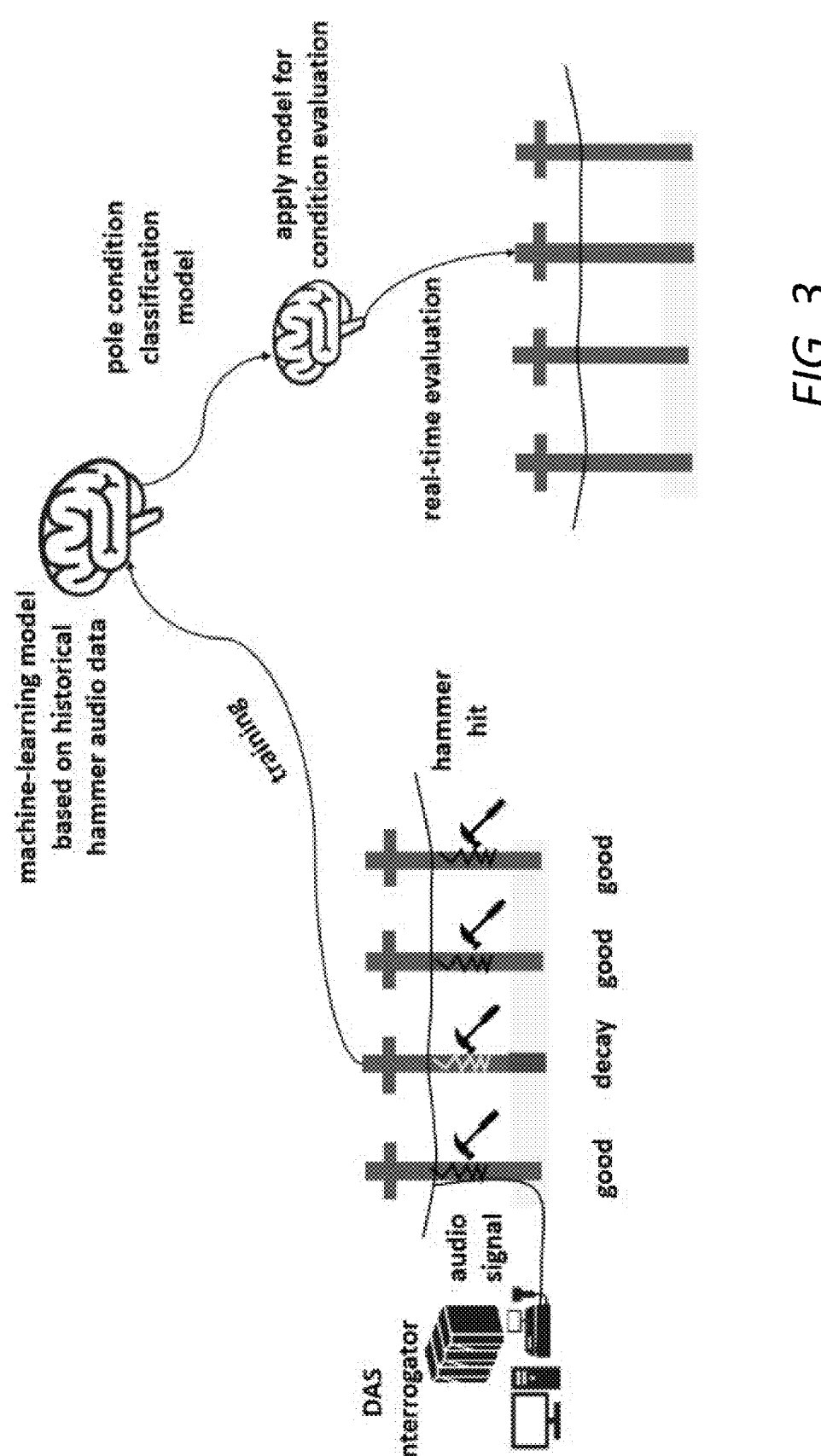
FIG. 3 is a schematic diagram illustrating elements of a DFOS system and operation according to according to aspects of the present disclosure.

FIG. 3 is a schematic diagram illustrating elements of a DFOS system and operation according to according to aspects of the present disclosure. As illustrated in this figure, there are three major operational activities associated with our inventive method. A local operation that collects impact (hammer) data that occurs along an inspection route including an DFOS optical sensor fiber (cable) and wooden utility poles, a cloud operation that trains machine learning models from historical data collected along the inspection route, and a edge operation the provides real-time evaluation of wooden utility pole condition using the machine learning models and provides automatic, real-time reporting about such condition.

A local server is configured to provide local data collection services. The collected raw data from distributed acoustic sensing can be preprocessed or converted to audio signals. Cloud server(s) is/are configured to provide cloud services modules which take preprocessed historical audio data (decayed and good poles) from the local module as input and constructs a learned machine learning model of utility pole condition classification. In a preferred embodiment, a GPU is used in the cloud services implementation to improve computational efficiency. Finally, an edge module host is configured to host the learned machine learning model and it is advantageously implemented in end-user devices such as laptops, pads, and smartphones. This operational module conveniently delivers a wooden utility pole inspection report to an end user or other person such that an end-user can access the report in real-time.

Figure 4:
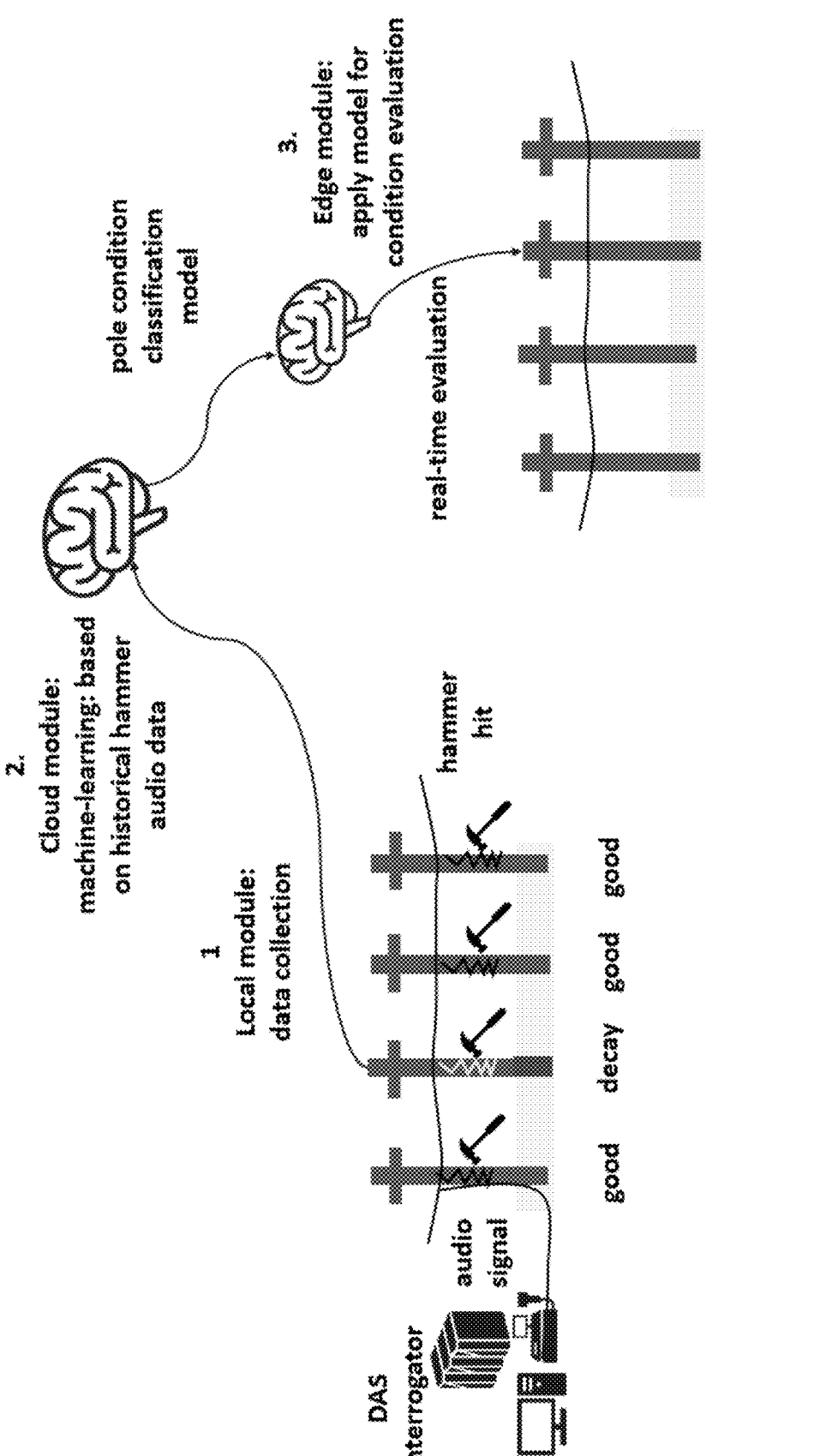
FIG. 4 is a schematic diagram illustrating operational flow of a DFOS system and operation according to aspects of the present disclosure.

FIG. 4 is a schematic diagram illustrating operational flow of a DFOS system and operation according to aspects of the present disclosure.

Figure 5:
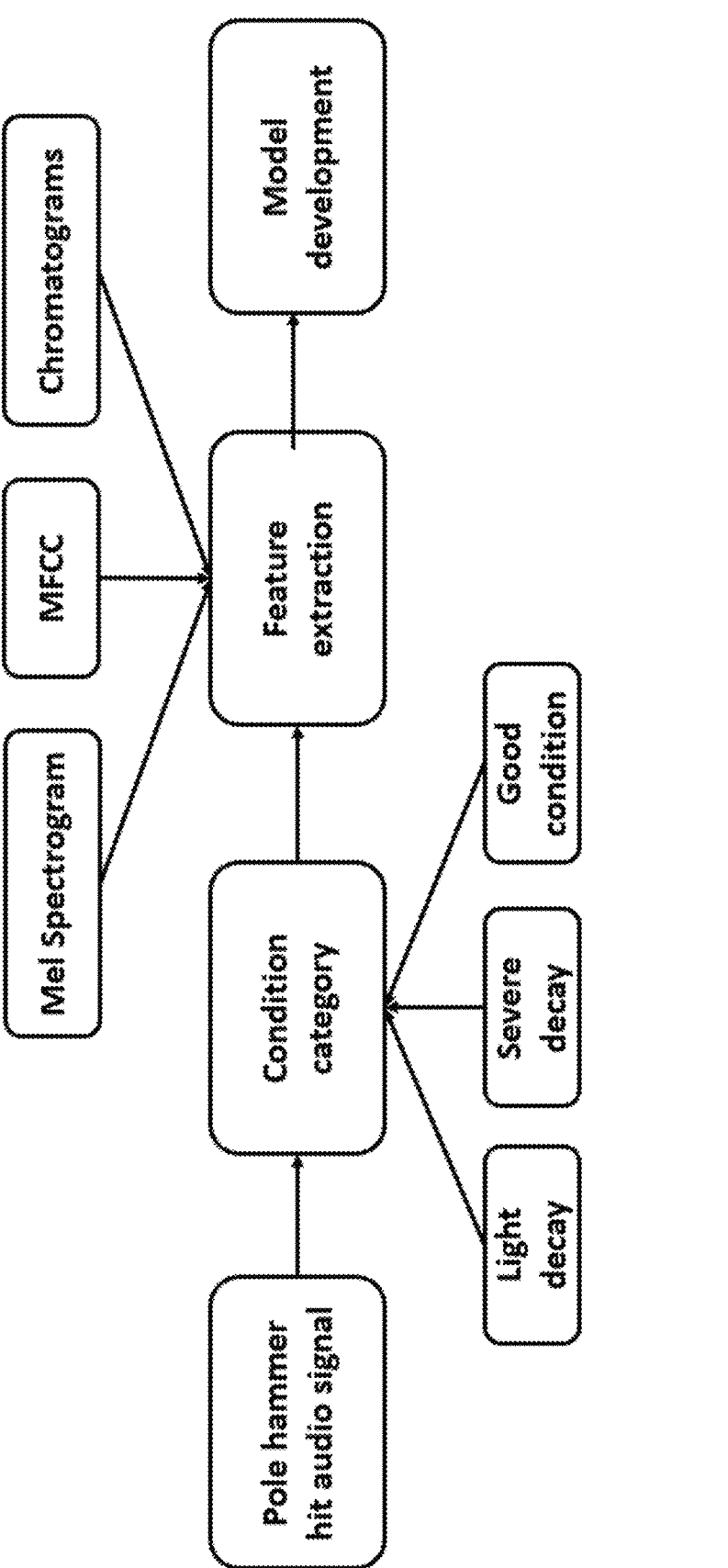
FIG. 5 is a schematic diagram illustrating main components of cloud module according to aspects of the present disclosure.

FIG. 5 is a schematic diagram illustrating main components of cloud module according to aspects of the present disclosure.

At this point and with reference to this figure, we note that of the several major operational components of our inventive systems, methods, and structures, the cloud server is configured to perform the following operations:

Condition categorization: categorize the audio data from hammer impact into different groups based on the level of their condition;

Feature extraction: extract three types of audio features from the audio signal, including the Mel Spectrogram, Mel-Frequency Cepstral Coefficients (MFCC), and chromatograms; and Model development: build a classifier to evaluate the pole condition.

Figure 6A:
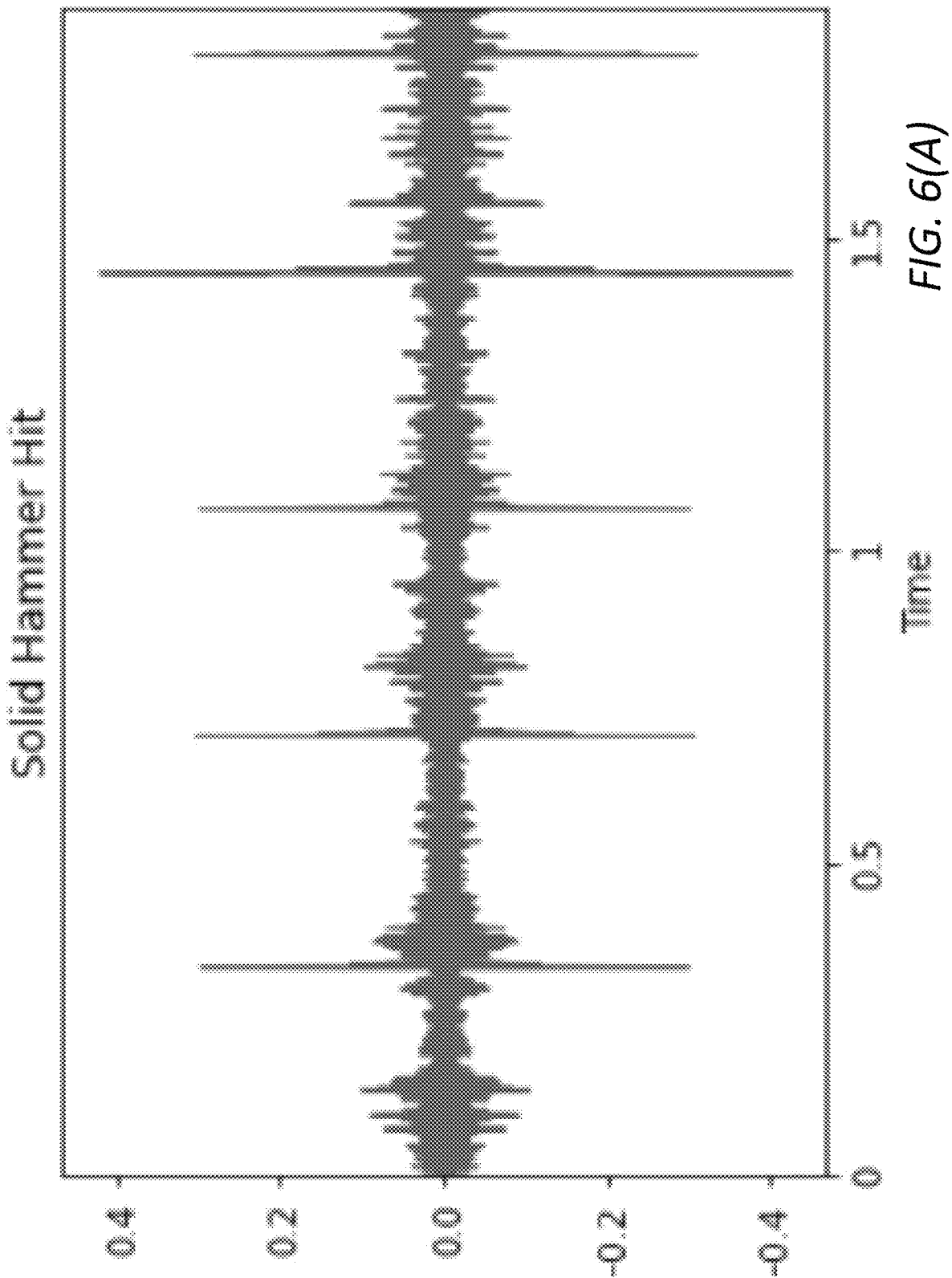
FIG. 6(A) is a plot illustrating example hammer impact on a solid wooden utility pole according to aspects of the present disclosure.

FIG. 6(A) is a plot illustrating example hammer impact on a solid wooden utility pole according to aspects of the present disclosure.

Figure 6B:
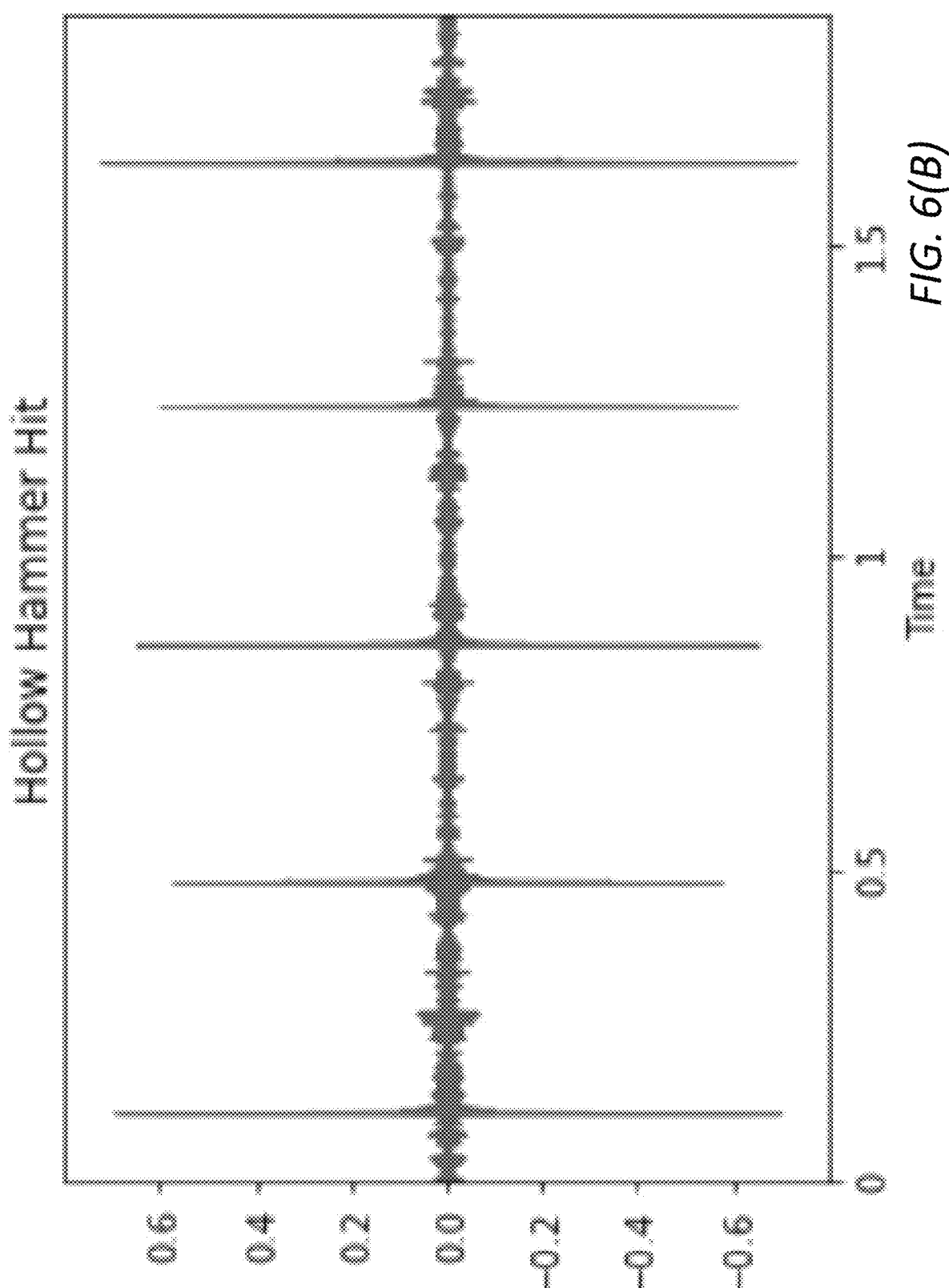
FIG. 6(B) is a plot illustrating example hammer impact on a hollow wooden utility pole according to aspects of the present disclosure.

FIG. 6(B) is a plot illustrating example hammer impact on a hollow wooden utility pole according to aspects of the present disclosure.

Figure 7A:
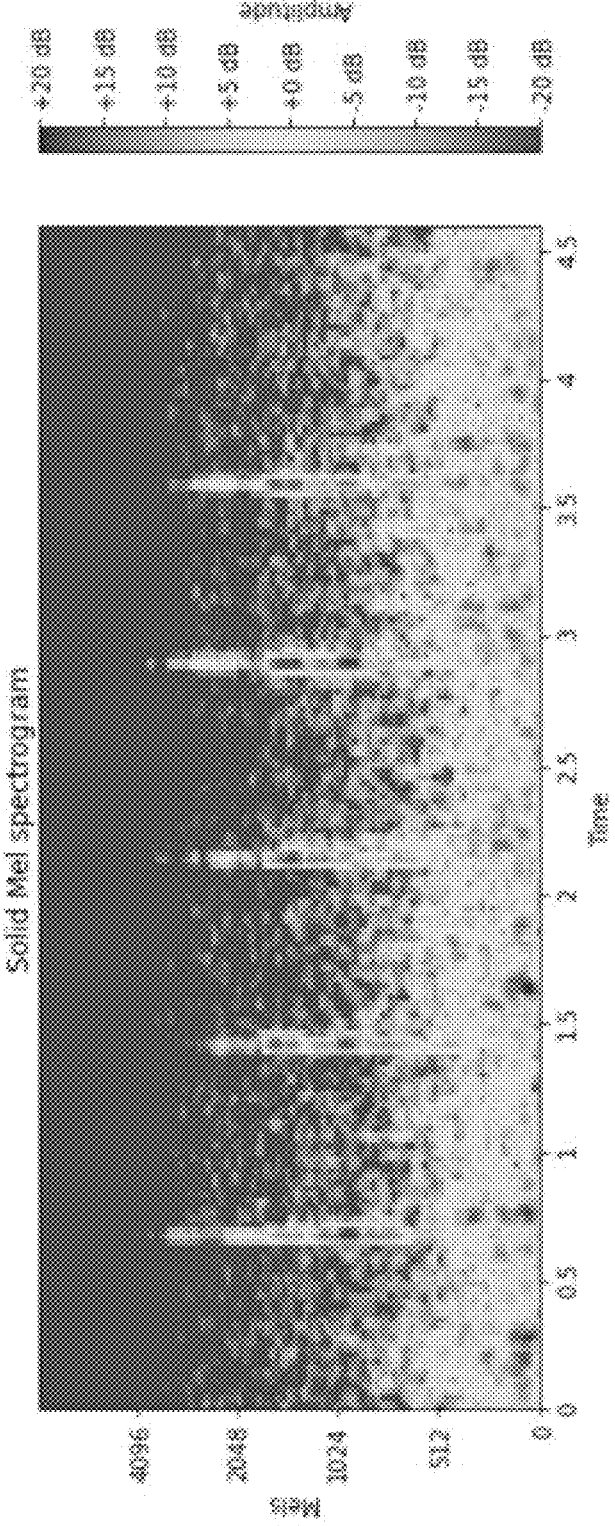
FIG. 7(A) is a plot illustrating example hammer impact on a solid wooden utility pole producing solid Mel Spectrogram according to aspects of the present disclosure.

FIG. 7(A) is a plot illustrating example hammer impact on a solid wooden utility pole producing solid Mel Spectrogram according to aspects of the present disclosure.

Figure 7B:
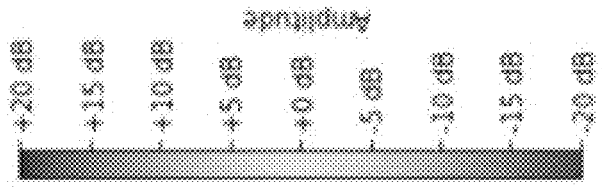
FIG. 7(B) is a plot illustrating example hammer impact on a hollow wooden utility pole producing hollow Mel Spectrogram according to aspects of the present disclosure.
Figure 7B:
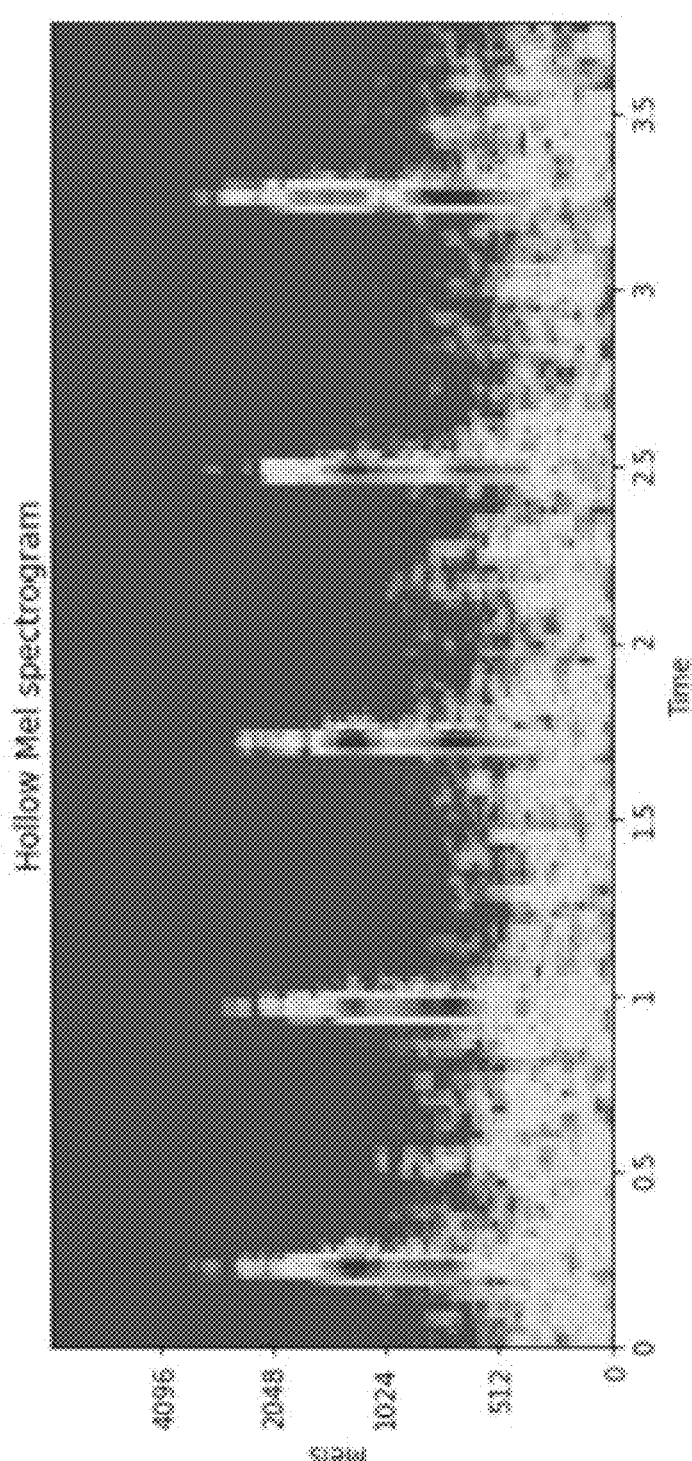

FIG. 7(B) is a plot illustrating example hammer impact on a hollow wooden utility pole producing hollow Mel Spectrogram according to aspects of the present disclosure.

Figure 8A:
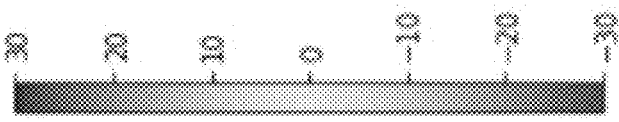
FIG. 8(A) is a plot illustrating example hammer impact on a solid wooden utility pole producing solid MFC Coefficients according to aspects of the present disclosure.
Figure 8A:
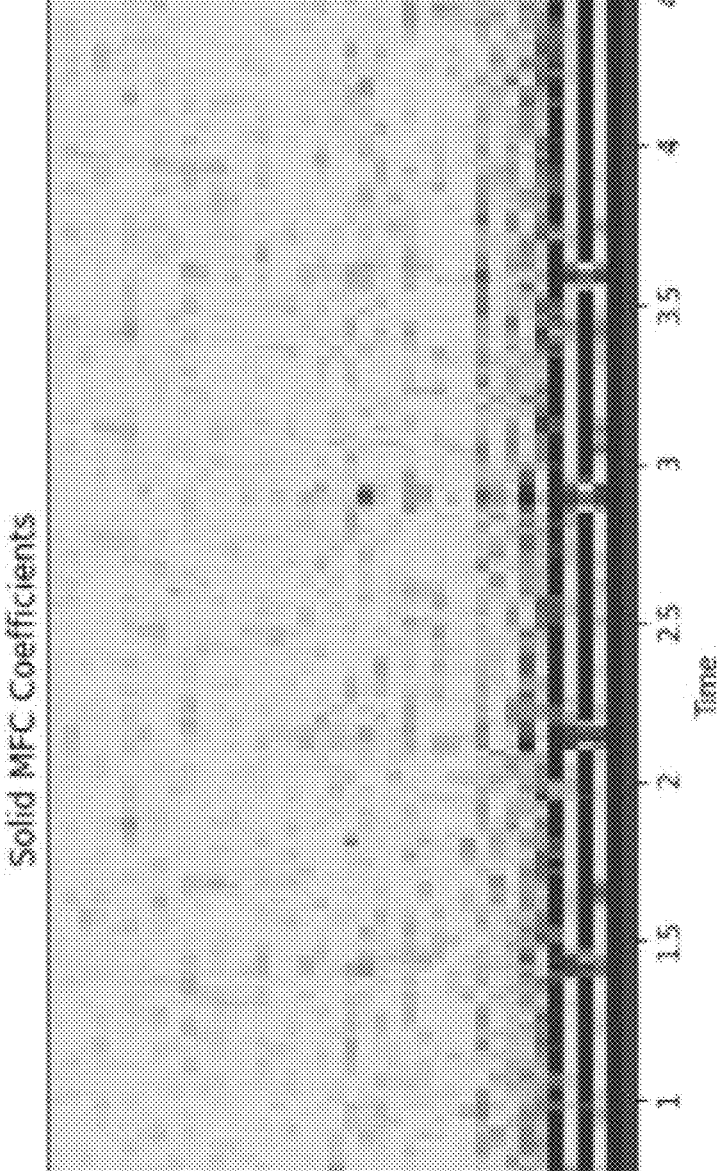

FIG. 8(A) is a plot illustrating example hammer impact on a solid wooden utility pole producing solid MFC Coefficients according to aspects of the present disclosure.

Figure 8B:
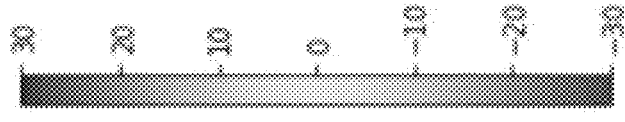
FIG. 8(B) is a plot illustrating example hammer impact on a hollow wooden utility pole producing hollow MFC Coefficients according to aspects of the present disclosure.
Figure 8B:
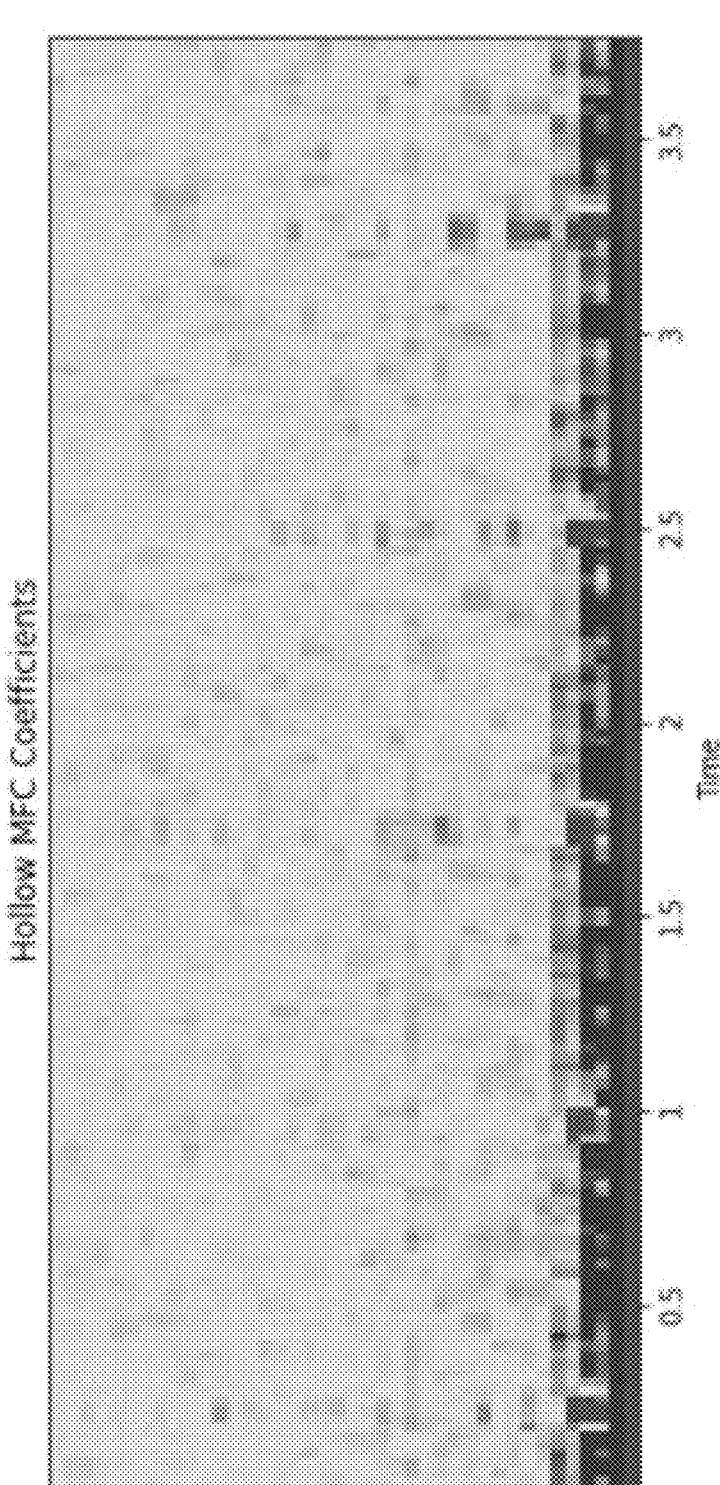

FIG. 8(B) is a plot illustrating example hammer impact on a hollow wooden utility pole producing hollow MFC Coefficients according to aspects of the present disclosure.

Figure 9A:
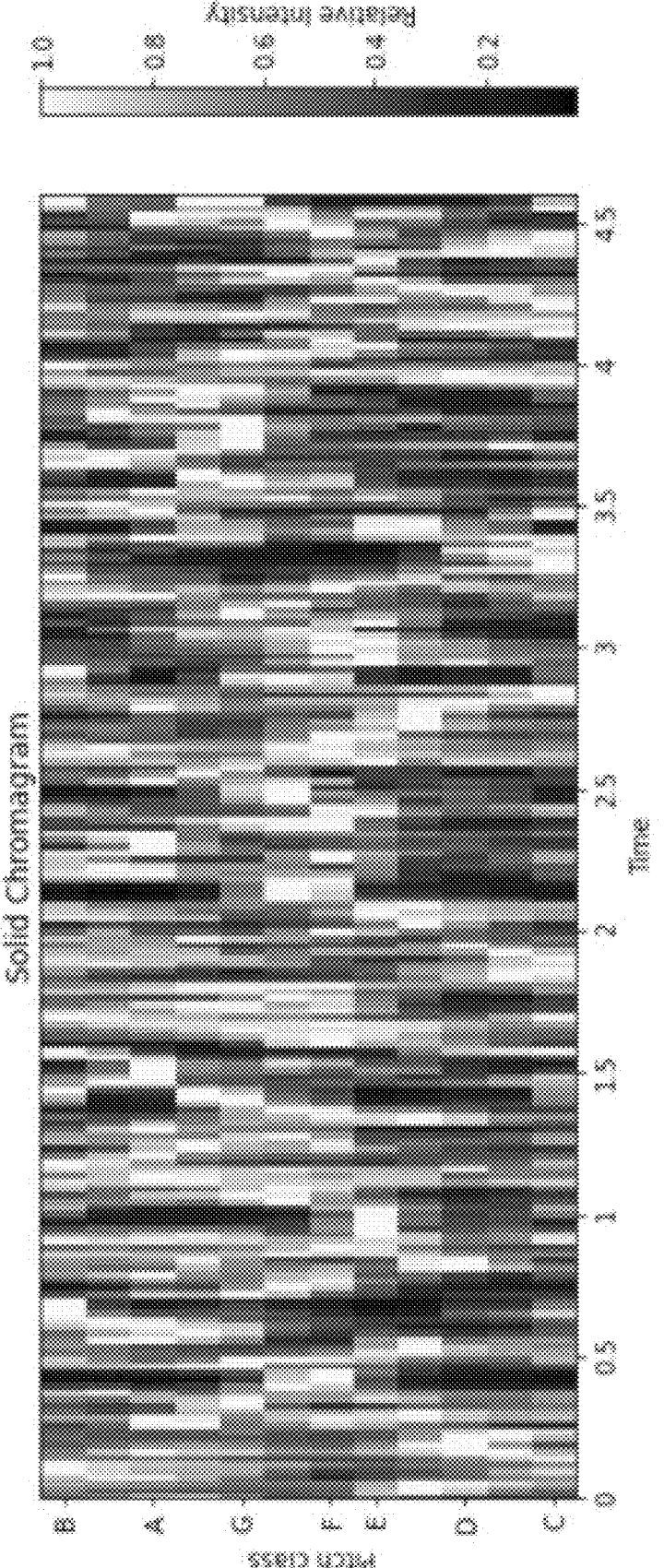
FIG. 9(A) is a plot illustrating example hammer impact on a solid wooden utility pole producing solid Chromagram according to aspects of the present disclosure.

FIG. 9(A) is a plot illustrating example hammer impact on a solid wooden utility pole producing solid Chromagram according to aspects of the present disclosure.

Figure 9B:
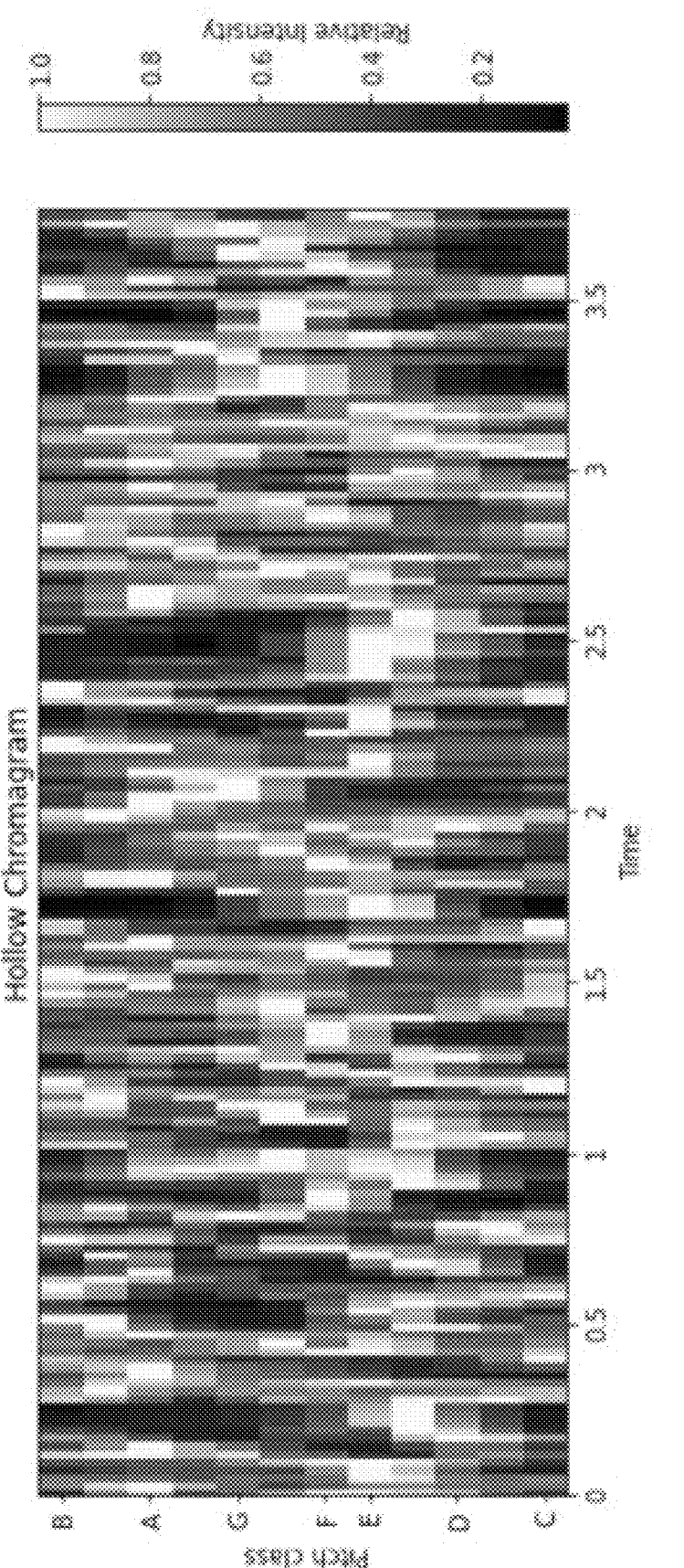
FIG. 9(B) is a plot illustrating example hammer impact on a hollow wooden utility pole producing hollow Chromagram according to aspects of the present disclosure.

FIG. 9(B) is a plot illustrating example hammer impact on a hollow wooden utility pole producing hollow Chromagram according to aspects of the present disclosure.

Data Collection

A data collection operation proceeds by connecting a DFOS/DAS distributed acoustic sensing arrangement to a target optical fiber route including wooden utility poles having various wooden pole mechanical conditions. A technician/inspector inspects the utility poles by mechanically impacting the wooden utility poles along the length of the route. The distributed acoustic sensing system records the raw impact data for each wooden utility pole so impacted.

After the inspection, raw vibration data is converted to an audio signal including sound of wooden utility poles when struck/impacted by the technician/inspector. For example, for poles with decay, the sound is hollow and dull, whereas, for good poles, the sound is solid and clear. Those audio signals are uploaded to the cloud for machine learning development. Each audio file should contain at least one hammer hit/impact for feature extraction.

Audio data preprocessing: checks the audio samples to ensure they are equal in length and dimensions (mono [ie. 1 audio channel]; stereo [ie. 2 audio channels]), sampling rate, and padded with silence at either end. FIG. 6(A) and FIG. 6(B) shows an example of the preprocessed audio files with the same length, dimension, and sampling rate.

Condition Category:

Based on the end-user requirements of pole evaluation criteria a historical hammer/impact data, we can define the pole condition category. For example, in this invention, we can define three categories: light decay, severe decay, and good condition. Those condition categories are defined based on the audio signal characteristics.

Feature Extraction

A Mel Spectrogram, MFCC, and Chromagrams of each audio file as separate features are considered in this step. Since the Mel Spectrogram, MFCC, and Chromagrams are calculated on audio frames produced by short-time Fourier transform (STFT), the mean of those matrices is to produce a single feature array for each feature and each audio sample will be used. That's means, for each audio sample, we will have three feature arrays. Based on the number of Mel frequency bands defined, the corresponding number of Mel Spectrogram features will be produced.

For example, in an illustrative embodiment, we define the number of mel frequency bands as 128, in this way, Mel Spectrogram will produce 128 features. Similarly, we define the number of coefficients to return as 40, so we produce 40 MFCCs for each audio sample. For Chromagrams, we will produce 12 features which include the 12 pitch classes. FIGS. 7(A), 7(B), 8(A), 8(B), 9(A), and 9(B) shows the features of hammer hit audio signals.

To properly train our machine learning model on the datasets, we first need to scale our features. This is especially crucial for models which compute distances between data, and for Deep Neural Networks (DNNs). If there is a difference in the variance of features simply because of the range of values, then a model will learn that the features with the greatest variance are the most significant. However, differences in the variance of unscaled features belonging to different and unknown distributions are an improper measurement of importance. So before the datasets can be fed into a model, we need to scale the data. Since we do not know the distribution of the data, we use standard scaling which is less sensitive to outliers.

Model Development

To build the pole condition classification model, we choose the Random Forests model due to its low time complexity to train and because it is an ensemble method, their robustness to unknown distributions in the datasets.

Figure 10:
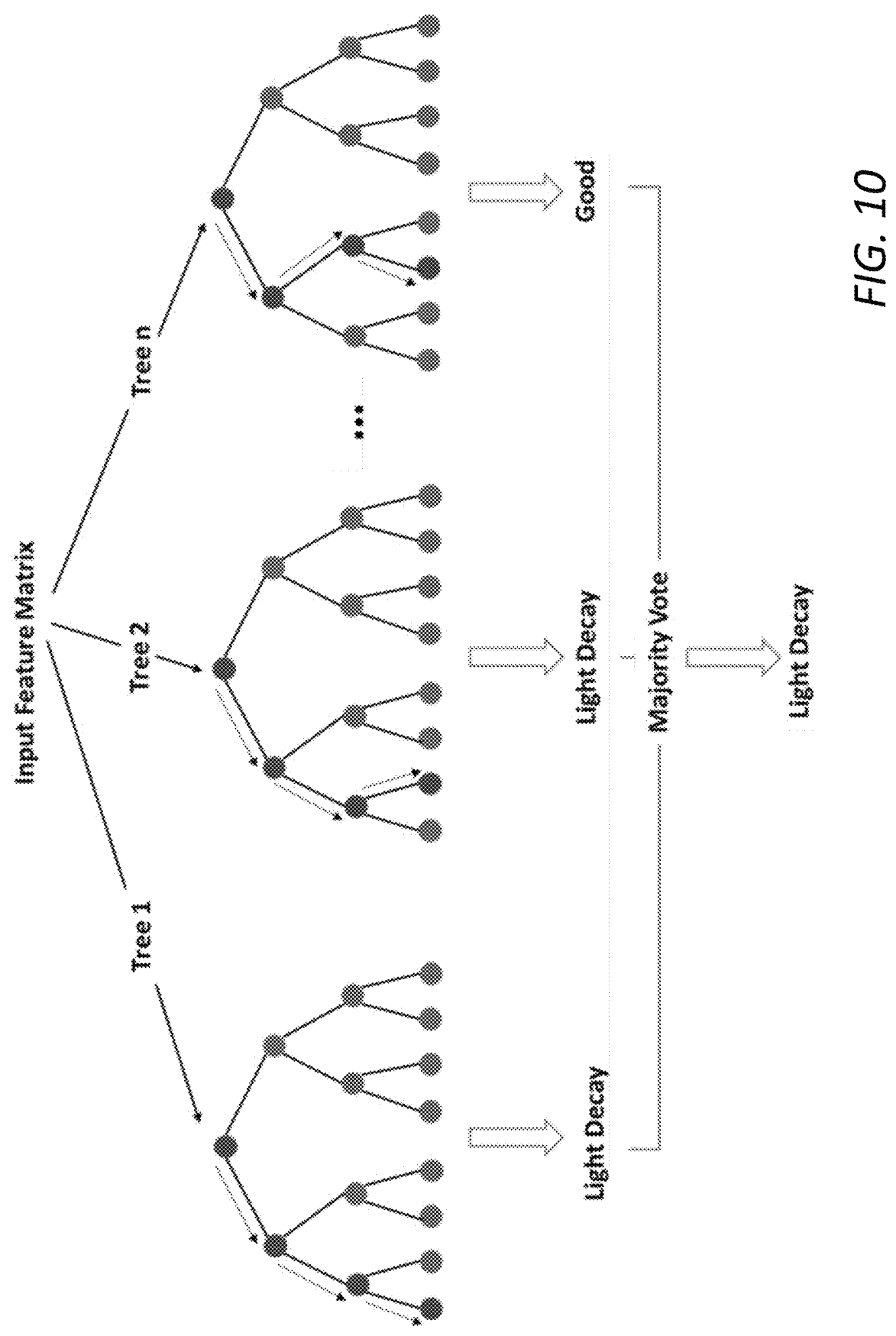
FIG. 10 is a graph illustrating an example random forest architecture implemented in our pole condition classification model according to aspects of the present disclosure.

FIG. 10 is a graph illustrating an example random forest architecture implemented in our pole condition classification model according to aspects of the present disclosure. Operationally, we train many distinct decision trees that are essentially directed acyclic graphs (DAGs). The collection of decision trees builds up our Random Forest model. At each node of the tree, a function evaluates which class does that node belongs to. Each edge of the graph (branch) represents one of two possible results from a node, and each leaf defines one of two decisions made by its parent node. In the Random Forest model, each tree evaluates a random subset of the features and had a rule at each level of the tree that classifies the pole condition based on the random features selected.

Operationally, our implementation of a Random Forest model involves the following steps:

First, we define the number of trees in our forest, such as N.

Next, we create N datasets of the same size which is sampled from the original datasets T with replacement (n times for each dataset). Then we will have a total of $\{T_1, T_2, T_3, T_N\}$ datasets. Each of these is called a bootstrap dataset.

Next, Random Forest creates Decision trees and uses $$m = \sqrt[2]{M}$$

random subfeatures out of M possible features to create any tree,

For each $T_i$ the bootstrap dataset we create a tree $K_i$. Suppose our input audio file is $X=\{x_1, x_2, x_M\}$. We let A pass through each tree and produce N outputs (total number of decision trees) that can be denoted by $Y=\{y_1, y_2, y_3, y_N\}$.

The final prediction is a majority vote on this dataset.

Our model performance is evaluated by the Out-of-Bag Score (OOB Score) an internal model performance metric unique to Random Forests. The OOB Score is computed as the number of correctly predicted rows from the out-of-bag sample.

Figure 12:
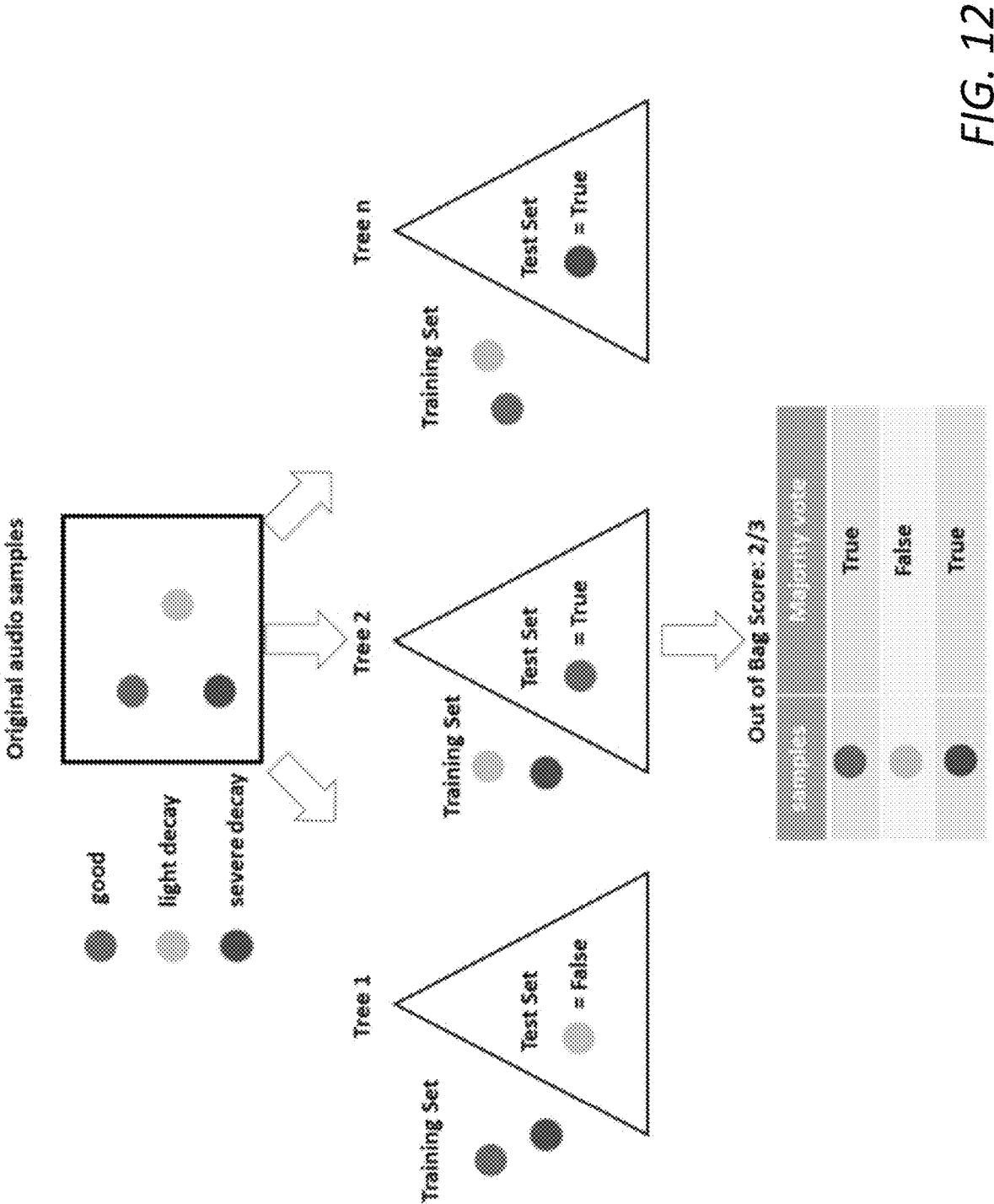
FIG. 12 is a schematic diagram illustrating out-of-bag score calculation according to aspects of the present disclosure.

FIG. 12 is a schematic diagram illustrating out-of-bag (OOB) score calculation according to aspects of the present disclosure. In this figure, Sample1 does not have the "severe decay" whereas sample n had all the condition categories equal to the main training set. While making the samples, audio samples were chosen randomly and with replacement, and the audio samples that fail to be a part of that particular sample are known as Out-of-Bag samples.

Real-Time Evaluation

In this step, the edge module fetches the trained model developed in the cloud module and applies the model on real-time hammer hit data. The model classifies the pole conditions into the categories the end-user defined and the inspection report can be accessed by the end-user in real-time or be saved to a cloud/local machine for later access.

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed fiber optic sensing (DFOS)/distributed acoustic sensing (DAS) system configured for automated remote inspection of wooden utility poles, the system comprising:

a length of optical fiber sensor cable wherein at least a portion of the optical fiber sensor cable is suspended by a plurality of wooden utility poles;

a DFOS/DAS interrogator in optical communication with the length of optical fiber sensor cable;

an intelligent analyzer configured to collect and analyze DFOS/DAS sensing data received by the DFOS/DAS interrogator system;

a cloud-based machine learning model in operative communication with the intelligent analyzer, the model trained by using historical DFOS/DAS acoustic data derived from physically striking the plurality of wooden utility poles with an impact tool, the acoustic data including signals characteristic of both solid mechanical conditions and hollow mechanical conditions;

wherein during subsequent operation of the DFOS/DAS system, new acoustic data is generated by mechanically impacting a wooden utility pole with an impact tool, and the trained machine learning model determines the mechanical condition of the impacted wooden utility pole by classifying the new acoustic data based on extracted features, the extracted features comprising at least a Mel Spectrogram, Mel-Frequency Cepstral Coefficients (MFCC), and Chromagrams of the new acoustic data; and wherein the cloud-based machine learning model comprises a Random Forests model, wherein the Random Forests model comprises a collection of decision trees, and wherein the decision trees are directed acyclic graphs (DAGs).

\* \* \* \* \*